United States Patent

Abel

[11] 4,193,960
[45] Mar. 18, 1980

[54] METHOD OF FORMING A BEARING CONTACTOR

[75] Inventor: Martin L. Abel, Franklin, Mich.

[73] Assignee: Permawick Company, Inc., Detroit, Mich.

[21] Appl. No.: 857,037

[22] Filed: Dec. 2, 1977

Related U.S. Application Data

[62] Division of Ser. No. 618,337, Oct. 1, 1975.

[51] Int. Cl.² .............................................. D04H 1/64
[52] U.S. Cl. ...................................... 264/128; 264/109
[58] Field of Search ........................ 264/123, 128, 109

[56] References Cited

U.S. PATENT DOCUMENTS 3,166,615   1/1965   Farrell ................................. 264/123

Primary Examiner—Donald J. Arnold
Assistant Examiner—James R. Hall
Attorney, Agent, or Firm—Lane, Aitken & Ziems

[57] ABSTRACT

A method for forming a contactor adapted to transmit oil from a reservoir of oil-impregnated wicking material formed of a fluent mixture of oil and oil retaining particles to a bearing surface, includes the steps of filling a mold cavity of a predetermined size and shape with a charge of fibrous particles, compressing the particles to a density such that the spaces between the particles form a network of interconnected pores sized smaller than the interstices between the particles in the wicking material, and bonding the particles together to form a solid porous mass.

2 Claims, 7 Drawing Figures

METHOD OF FORMING A BEARING CONTACTOR

This is a division of application Ser. No. 618,337, filed Oct. 1, 1975.

BACKGROUND OF THE INVENTION

This invention relates to bearing assemblies which have a wick-type contactor plug for communicating a lubricant reservoir with the bearing surface and more particularly to a method of forming a contactor plug.

It has been found that an effective way to lubricate bearing surfaces, particularly sleeve bearings in electric motors, is to surround the bearing with a reservoir or cavity into which a lubricant-impregnated wicking material is injected. This type of material is well known and is commercially available under the registered trademark "PERMAWICK". Different forms of Permawick material are taught in U.S. Pat. Nos. 2,966,459, 3,214,375 and 3,466,244.

The bearing has an opening in it, referred to as the window, which communicates the shaft with the lubricant-impregnated wicking material. A plug or contactor formed of appropriately-shaped pieces of felt is typically placed in the window to deliver sufficient lubricant by capillary action from the wicking material to the bearing surfaces and to prevent erosion due to fibers in the wicking material being drawn between the bearing and shaft. The use of a contactor to solve this latter problem and to use a contactor for throttling oil from the wicking material to the bearing surface are taught in my U.S. Pat. No. RE 27,998.

Although there are many advantages in using an oil-impregnated wicking material instead of filling the reservoir with oil to lubricate bearing surfaces, one disadvantage is that it has been found that the wicking material does not release all of the lubricating oil contained in it, which necessitates a relatively large reservoir, operates to shorten the effective life of the lubricant and of the bearing surfaces, and results in a significant amount of lubricating oil never reaching the bearing surfaces and being wasted.

One attempt to solve this problem by altering the makeup of the wicking material is taught in U.S. Pat. No. 3,894,956 where a fibrous wicking material formed of foamed polymeric particles is used instead of the materials typically sold under the trademark "PERMAWICK". This material does tend to release more of the impregnated oil over time than the Permawick materials, but problems have developed because the oil tends to be released from the particles at a rate which is too high and which contributes to oil leaking from the bearing and prevents the wicking material from reabsorbing the oil as fast as it should.

Another problem with the bearing assemblies of the type described above has been found to stem from the type of contactor which is used. In the past, these contactors have typically been formed by cutting or stamping appropriately shaped pieces from a relatively large sheet of commercially available felt. Care must be taken in cutting the contactor and assemblying it in the window because contactors with different flow characteristics result if all the contactors cut from the same sheet are not positioned so that their fibers are oriented in the same direction. Furthermore, it has also been found that flow characteristics oftentimes differ when contactors are cut from different sheets even though the felt is graded the same, which makes it difficult to predict relative performance levels. Another problem is that the surface of the felt which contacts the shaft tends to become glazed due to deterioration of the wool fibers which make up the felt. The glazing plugs the openings in the contactor and lowers the ability of the contactor to transfer oil from the wicking material to the bearing surface, which increases frictional heat and contributes to a shorter bearing life.

SUMMARY OF THE INVENTION

These problems have been solved, in accordance with the invention, by providing the improved contactor described below, instead of altering the composition of the fibers which make up the lubricant-impregnated wicking material as was done in U.S. Pat. No. 3,894,956. In this way, commercially-available Permawick material with known performance levels can advantageously be used as the wicking material and delivery of a significantly greater amount of the lubricating oil to the bearing surfaces can still be provided.

The improved contactor is formed by compressing a fibrous material such as cotton linters in a mold of appropriate shape to a predetermined density and saturating the compressed fibers with a bonding and coating agent such as nylon which forms a somewhat solid mass and contains a network of interconnected pores throughout. The pores should be smaller than the interstices between the fibers in the wicking material so that oil will be drawn into the contactor by capillary action. This can be accomplished by making the density of fibers in the contactor before the bonding agent is added greater than the density of similar fibers used in the wicking material before oil is added. Since the fibers which make up the contactor are believed to be coated to a great degree with the bonding agent it is believed that significantly less oil will be absorbed by the fibers themselves than in known contactors where the fibers are not coated, and that most if not all of the oil will be contained in the interstices or pores between the coated fibers. It is believed that this latter feature is an important factor in enabling the improved contactor to deliver to the bearing surfaces a greater amount of the oil held by the wicking material.

As shown in the examples below, this improvement results in releasing over time to the bearing surfaces a much greater percentage of the oil held by the wicking material, but without the disadvantageous higher initial release rate associated with the material described in U.S. Pat. No. 3,894,956. The improved contactor operates as a throttle for the oil and provides significantly greater control and predictability over the oil release rate than was possible in prior art contactors.

By forming the contactor as described above, the density of the fibers and accordingly the pore size can easily be adjusted relative to the density and pore size of the fibers in the wicking material. This adjustment can be used to effectively control the initial release rate of the oil as well as the total amount of oil released over time. In addition, because a greater amount of oil in the oil-impregnated wicking material is released the size of the cavity or reservoir in which the wicking material is kept can be reduced. Since a material such as cotton linters with greater resistance to glazing than felt and a bonding agent such as nylon with good wear resistance can be chosen the glazing problem mentioned above is also eliminated. By forming the improved contactor in a mold, it is much easier to control the size and shape than was possible by cutting them from commercially-available sheets, and the accompanying orientation problem mentioned above is no longer a concern because of the uniform distribution of pores throughout the molded contactor.

BRIEF DESCRIPTION OF THE DRAWINGS

For a better understanding of the invention, reference may be had to the following description of an exemplary embodiment, taken in conjunction with the accompanying drawings, in which.

DETAILED DESCRIPTION OF AN EXEMPLARY EMBODIMENT

Now an exemplary embodiment of the inventive contactor and a method for making it will be described in detail.

The contactor can be formed of cotton linter fibers which are pure cellulose and produced from the second cut of the delinting process of cotton seed. These fibers are commercially available in sheet form from Hercules Powder Company as its type PSOO and can easily be removed from the sheet by a hammer mill or other appropriate means. The fiber size distribution is about the same as that used in forming wicking material—the average length being about 2.3 mm. with about 70% of the fibers being between 1.0 and 3.5 mm. long. The fibers are then packed in the mold shown in FIG. 1 at a predetermined density.

Figure 1:
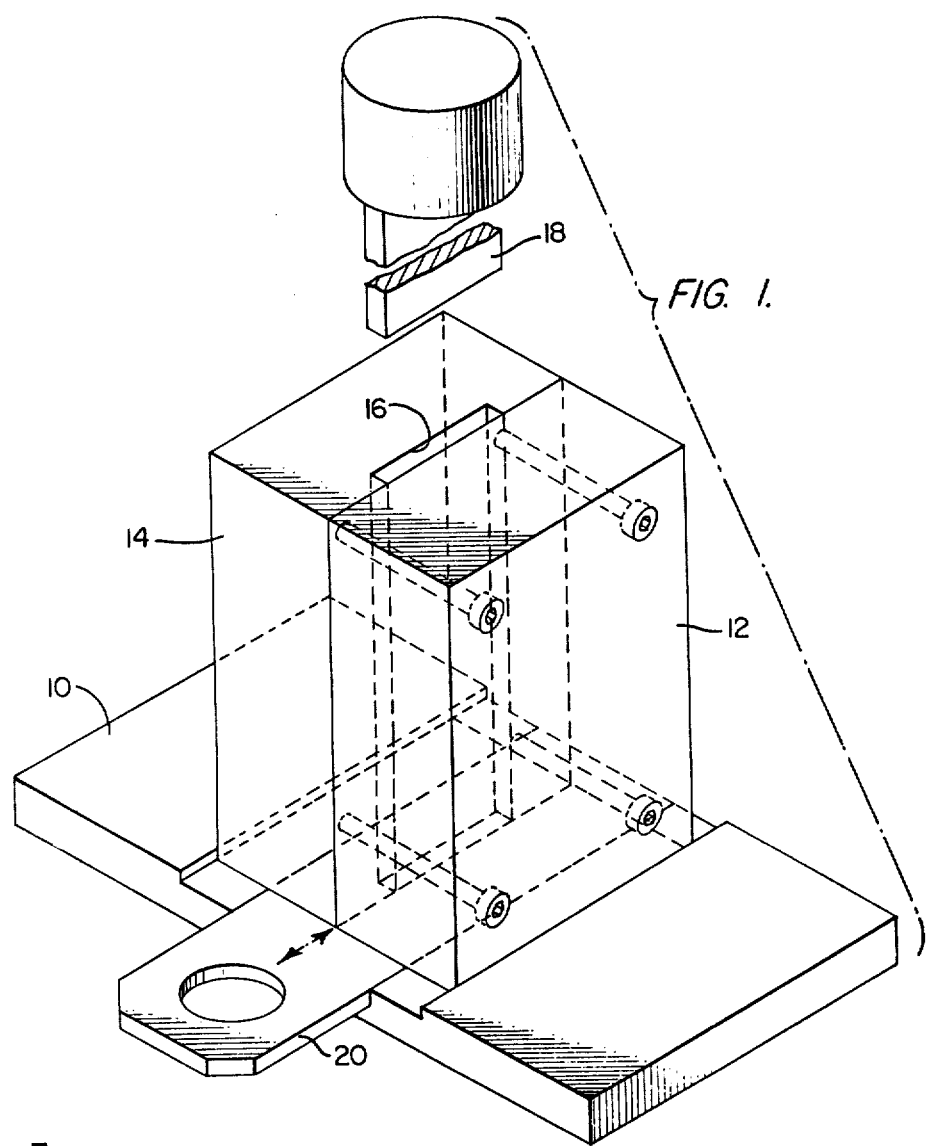
FIG. 1 is a perspective view of the mold and ram used to form the test contactors.

As shown in FIG. 1, the base 10 of the mold is slotted to receive the cavity body formed of the sections 12, 14, which are bolted together. This construction lends itself to a simple machining procedure to form the mold cavity 16. When bolted together, alignment and rigidity of the mold for effective use in conjunction with a hydraulic press is assured. A mating male ram 18 is machined to match the cavity contour with approximately 0.010 in. clearance. The length of the mating portion of the ram 18 is such that upon complete insertion of the mating portion fiber material in the mold cavity 16 is compressed to a predetermined thickness using the removable slide 20 as the bottom of the mold cavity 16. Removal of the contactor is accomplished by partial withdrawal of slide 20, which allows the finished contactor to drop or be pushed down from the cavity 16 and then be pushed out with the slide 20. This design is adaptable to all contactor shapes.

The contactors used in Examples 1-3 measured $1''\times\frac{1}{4}''\times\frac{1}{4}''$. For each of the examples, 0.45 gm. of the cotton linter fibers was packed in the mold by compressing the fibers with the ram 18 at about 10,000 p.s.i. The resultant fiber density was about 0.438 gm./cm.$^3$.

While the fibers were in the mold and after the ram 18 was withdrawn, 1.6 gms. (or about 30 drops) of a warm 2.5% by weight nylon-alcohol solution were added. This amount of nylon represents the level at about which the fibers in the mold became saturated with the nylon solution. After the alcohol evaporated the contactor was dry and removed from the mold. It was observed that many of the individual fibers appeared to absorb the nylon and also become coated with it to form the solid mass of fibers which were bonded together and which contained a network of interconnected pores as discussed above.

Figure 3:
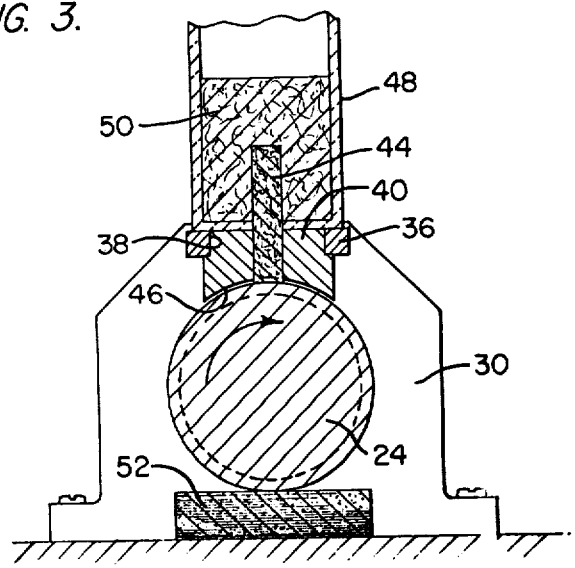
FIG. 3 is an end view, partially in section, of the apparatus shown in FIG. 2.
Figure 4:
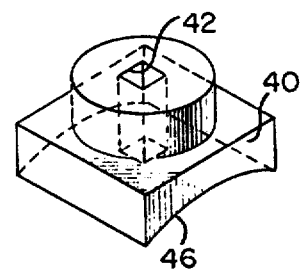
FIG. 4 is a perspective view of the mounting block on which the test specimens for the apparatus shown in FIGS. 2 and 3 are mounted.
Figure 2:
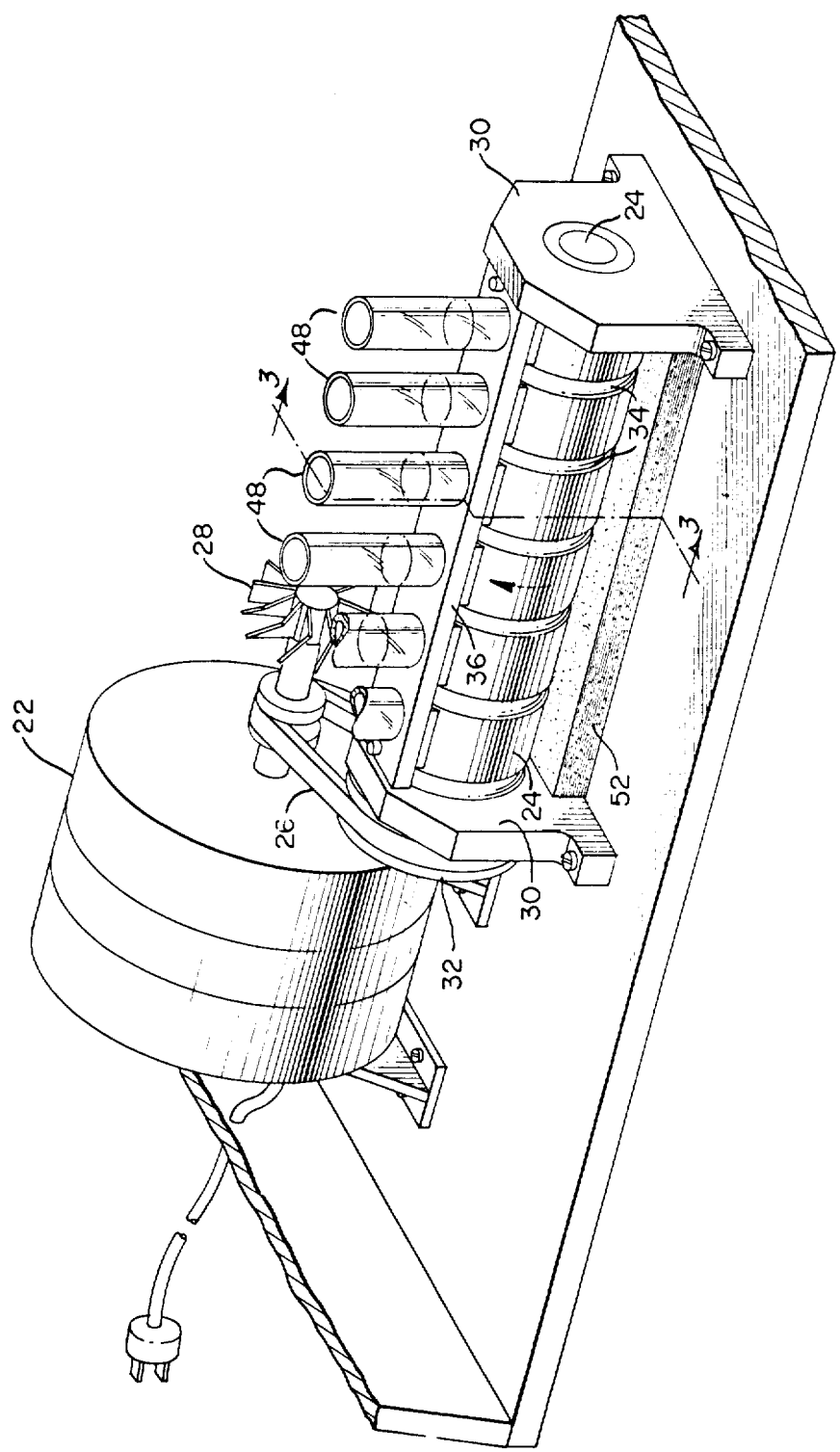
FIG. 2 is a perspective view of the apparatus used to test the improved contactors and compare them with prior art contactors.

The test apparatus which was used for each of the examples is shown in FIGS. 2, 3 and 4. The apparatus is housed in a clear plastic enclosure provided with a removable cover (not shown) so that the surrounding temperature can be controlled. The apparatus includes an electric motor 22 which drives the shaft 24 through the belt 26. A fan 28 is connected to the motor shaft to circulate the motor heat evenly throughout the enclosure.

The shaft 24 is rotatably mounted on the support plates 30 and is driven by the belt 26 through the pulley 32. The desired surface velocity of the shaft 24 is obtained by selecting an appropriate diameter for the pulley 32.

The shaft 24 is designed to simulate a motor shaft bearing contact surface and as a result the outer surface of the shaft is smoothly finished and rotated at a predetermined surface velocity. The outer surface of the shaft 24 includes a number of grooves 34 machined therein which have the effect of dividing the test surface into equally spaced discrete test areas to permit, on this machine, as many as six (6) tests being conducted individually or simultaneously.

As shown best in FIGS. 2 and 3, a support plate 36 is mounted above the shaft 24 and contains six openings 38 therein. These openings 38 are sized to accommodate the mounting blocks 40 shown in particular in FIG. 4, which are formed of brass and press fitted into the openings 38. The mounting blocks 40 each include an opening 42 which is sized and shaped to accommodate the test contactor 44, which in this case measures $\frac{1}{4}''\times\frac{1}{4}''$. The lower surface 46 of the mounting blocks 40 are machined at a radius which corresponds to the radius of the outer surface of the shaft 24. For the purpose of the examples discussed below, the shaft 24 was 1 in. in diameter. The mounting blocks 40 are sized so that there is a clearance of approximately 0.006 in. maintained between the radial surface 46 of the blocks and the test surface of the shaft 24. Clear plastic specimen containers 48 are mounted on top of the mounting blocks 40 as shown in FIG. 3. The specimen containers 48 are open at the top and have a centrally located square opening in the bottom to accommodate the test contactor 44, which is inserted through the bottom of the specimen container and the opening 42 located in the mounting block 40 so that it touches the outer surface of the shaft 24 as shown in FIG. 3.

The procedure followed for assemblying the test apparatus is as follows. The contactors 44 were formed as described above and then inserted through the openings 42 in the mounting blocks 40. The specimen containers were then placed over the contactors 44, permitting them to project into the containers 48 which already were charged with a predetermined amount of lubricant-impregnated wicking material 50. A space was pre-formed in the wicking material to allow the test contactor to enter it and make intimate contact with the material. After the specimen container is positioned as shown in FIG. 3, the wicking material is compressed again to insure full face contact between the wicking material and the contactor 44. A pad of highly absorbent paper 52 is placed in light contact with the lower surface of the shaft 24 so that lubricant which is transferred from the wicking material to the shaft surface is continuously wiped away.

After a specified operating period, the containers and test contactors are again weighed and the difference between that weight and the original weight of the contactor and wicking material represents the amount of lubricant actually transmitted to the shaft during the specified period of time. The specimen container and contactor are then reinserted in the test apparatus and the procedure repeated. In this way, the actual rate at which the lubricant is transferred from the wicking material to the shaft surface can be accurately determined.

The tests described in the following examples were conducted with contactors formed as described above. The prior art contactors were formed of F-1 felt which had the same size and shape as the inventive contactors (e.g. 1"×¼"×¼"). The felt contactors had a density of about 0.332 gms./cm.$^3$. The shaft 24 was rotated at about 236 ft./min. which closely approximates the rotational velocity of a ⅜ in. diameter shaft rotated at 1750 r.p.m. which has a rotational velocity of 229/ft. min., the type shaft which is commonly used in electric motors. The temperture in the test apparatus was maintained at between 130–140° F.

The lubricated wicking material used in the tests is known as Permawick FHH wicking material which is commercially available from Permawick Company Inc., 5319 East Outer Drive, Detroit, Michigan 48234 and is the same material used in U.S. Pat. No. 3,894,956 (col. 9, lines 46–57; col. 10, lines 1–2). The percentage of fibers to oil was 84% oil to 16% fibers, by weight. A charge of 10 gms (8.4 gms. oil and 1.6 gms. fiber) was used for each test. The density of the fibers was 0.134 gm./cm.$^3$ before the oil was added.

The oil used in the tests is known as 280 type oil and is commercially available from Sun Oil Company. It is a highly refined paraffinic base stock mineral oil, blended with extreme pressure as well as with polarizing additives. The types of 280 oils used in the tests reflected in the graphs in FIGS. 5–7 were 280-3, 280-6 and 280-10, the different number designations indicating different additives. These oils can be purchased by designating the type desired when purchasing Permawick type wicking material.

EXAMPLE 1
280-3 oil was used.

| Time (hrs.) | Felt Contactor Oil Released (%) | Inventive Contactor Oil Released (%) |
|---|---|---|
| 1 | 14.0 | 8.3 |
| 3 | 26.3 | 16.9 |
| 6 | 29.5 | 31.5 |
| 12 | 35.5 | 42.7 |
| 24 | 37.3 | 66.4 |
| 50 | 44.0 | 82.1 |
| 100 | 44.3 | 83.0 |

Figure 5:
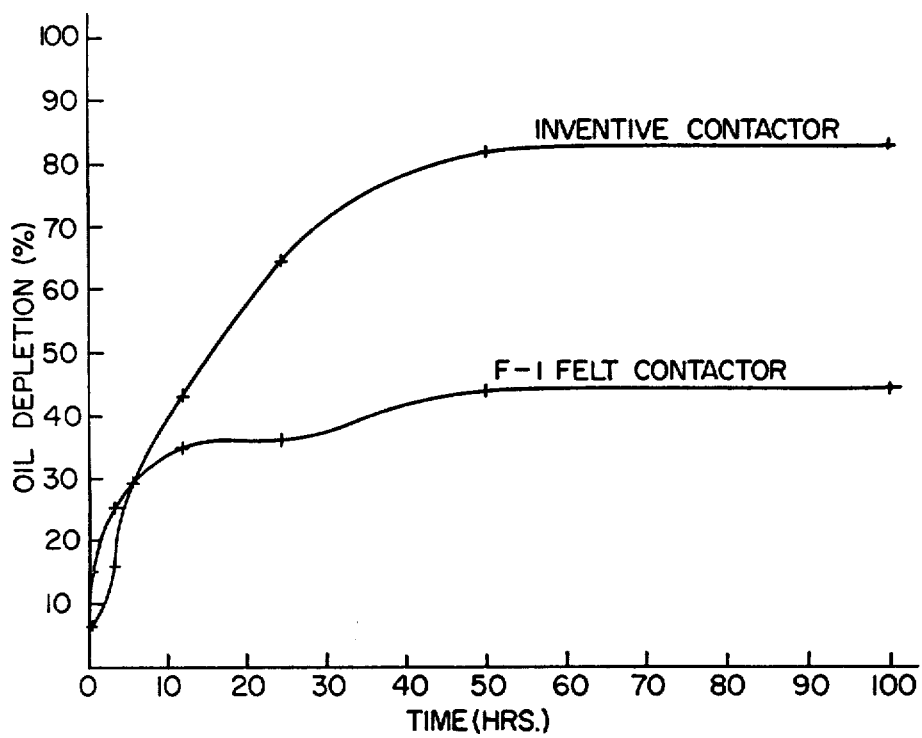
FIGS. 5-7 are graphs comparing the improved contactor with a prior art contactor.

These data are charted on the graph shown in FIG. 5.

EXAMPLE 2
280-6 oil was used.

| Time (hrs.) | Felt Contactor Oil Released (%) | Inventive Contactor Oil Released (%) |
|---|---|---|
| 1 | 17.2 | 9.4 |
| 3 | 28.2 | 17.3 |
| 6 | 37.5 | 31.8 |
| 12 | 45.9 | 46.2 |
| 24 | 46.4 | 64.7 |
| 50 | 47.7 | 76.8 |
| 100 | 50.4 | 90.8 |

Figure 6:
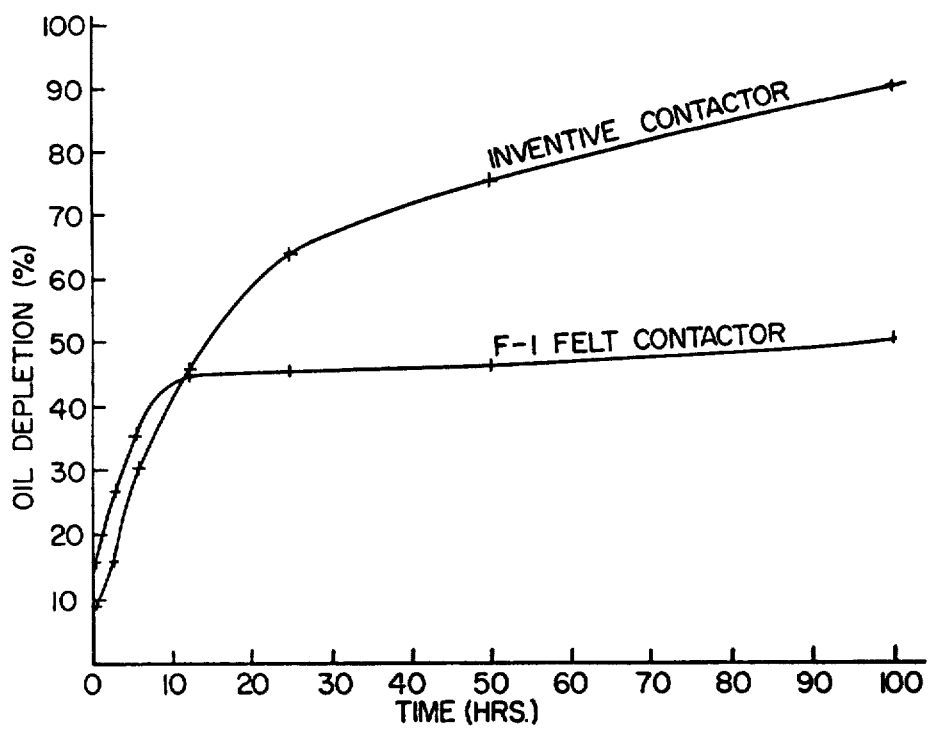

These data are charted on the graph shown in FIG. 6.

EXAMPLE
280-10 oil was used.

| Time (hrs.) | Felt Contactor Oil Released (%) | Inventive Contactor Oil Released (%) |
|---|---|---|
| 1 | 15.4 | 8.1 |
| 3 | 29.7 | 16.1 |
| 6 | 35.1 | 29.5 |
| 12 | 42.3 | 45.7 |
| 24 | 50.9 | 63.7 |
| 50 | 53.9 | 70.0 |
| 100 | 51.6 | 90.6 |

Figure 7:
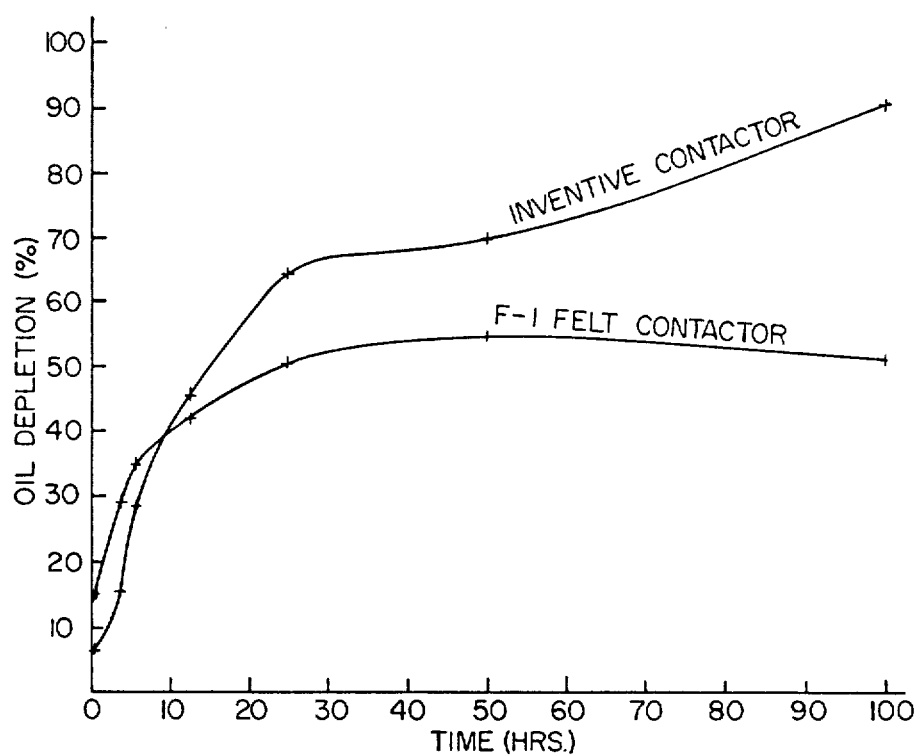

These data are charted on the graph shown in FIG. 7.

As can be seen from the above examples, the inventive contactor used with commercially-available Permawick material provided results far superior than the prior art felt contactor for both the initial oil release rate and the total amount of oil released over time. As also can be seen when the graphs in FIGS. 5–7 are compared with the graph in FIG. 10 of U.S. Pat. No. 3,894,956, the initial oil release rate of the inventive contactor used with Permawick material is not nearly as great as the material used in "Example 3" of that patent.

It is further believed that the inventive contactor can be advantageously used with wicking materials other than Permawick FHH material as long as the proper relationship between the size of the contactor pores and the size of the interstices of the fibers in the wicking material is maintained, so that capillary action will operate to pull the oil from the wicking material and into the contactor. When fibers are used to form the contactor the pore size can easily be controlled by controlling the density of the fibers before they are bonded together.

Thus, there is provided in accordance with the invention an improved contactor which transmits significantly more oil from oil-impregnated wicking material to the bearing surface over time than prior art contactors, coupled with the additional advantage of providing a lower initial release rate. In addition because a material more resistant to glazing than felt is used, the glazing problem heretofore present is eliminated.

The embodiment of the invention described above is intended to be merely exemplary, and those skilled in the art will be able to make modifications and variations to it without departing from the spirit and scope of the appended claims. All such modifications and variations are contemplated as falling within the scope of the claims.

I claim:

1. A method for forming a contactor adapted to transmit oil to a bearing surface from a reservoir of oil-impregnated wicking material having interstices therein, comprising:

(a) filling a mold cavity of a predetermined size and shape with a charge of a fibrous material;

(b) compressing the fibrous material in said mold cavity to a density wherein the fibrous material has therein a network of interconnected pores of a size smaller than the interstices in the wicking material;

(c) relieving the compressing force, while the compressed fibrous material retains said network of interconnected pores smaller than the interstices in the wicking material;

(d) saturating the prior compressed fibrous material with an alcohol-nylon solution;

(e) allowing the alcohol to evaporate whereby many of the individual fibers absorb the nylon and become coated with the nylon, thereby forming a contactor consisting of a dry mass of bonded fibers containing a network of interconnected pores of a size smaller than the interstices in the wicking material; and, (f) removing the contactor from the mold.

2. The method of claim 1, wherein the step of filling employs a fibrous material comprising cotton linter fibers having an average length of about 2.3 mm. with about 70% of the fibers being between 1.0 and 3.5 mm. long.

* * * * *